2 Sheets—Sheet 1.

E. B. BIGELOW.
HAY-CART.

No. 176,922. Patented May 2, 1876.

WITNESSES
John T. Whitman.
Daniel Merriman.

INVENTOR:
Erastus Brigham Bigelow.

E. B. BIGELOW.
HAY-CART.

No. 176,922.

2 Sheets—Sheet 2.

Patented May 2, 1876.

WITNESSES:
John T. Whitman,
Daniel Merriman.

INVENTOR:
Erastus Brigham Bigelow

UNITED STATES PATENT OFFICE

ERASTUS BRIGHAM BIGELOW, OF BOSTON, MASSACHUSETTS.

IMPROVEMENT IN HAY-CARTS.

Specification forming part of Letters Patent No. 176,922, dated May 2, 1876; application filed August 16, 1875.

*To all whom it may concern:*

Be it known that I, ERASTUS BRIGHAM BIGELOW, of Boston, in the county of Suffolk and State of Massachusetts, have invented an Improvement in Hay-Cart, of which the following is a specification:

My invention relates to the mode of constructing the body of the cart, and of holding its stakes in position. It has for its object the construction of a cart, which may be used as a hay-cart or as a box-cart, and be readily changed to adapt it to the one purpose or to the other, and which shall have large holding capacity as a hay-cart without the usual top rails, which obstruct the loading and unloading of the hay.

The accompanying drawings represent my improvement, and form a part of the specification.

Figure 1:
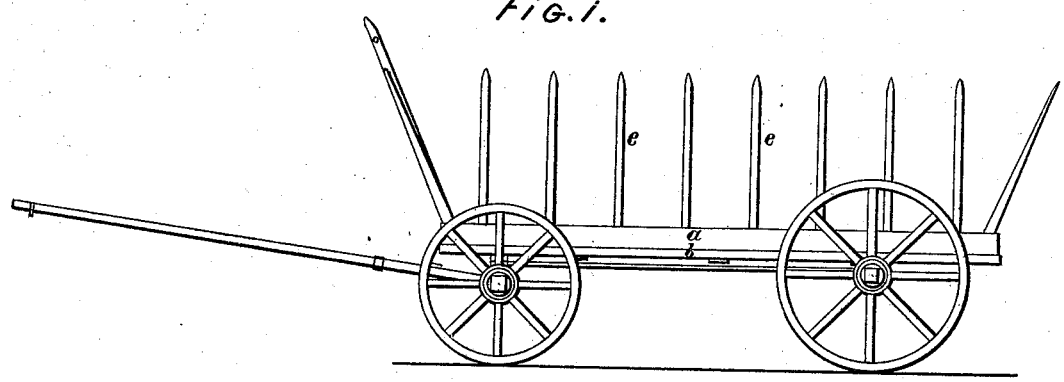
Figure 2:
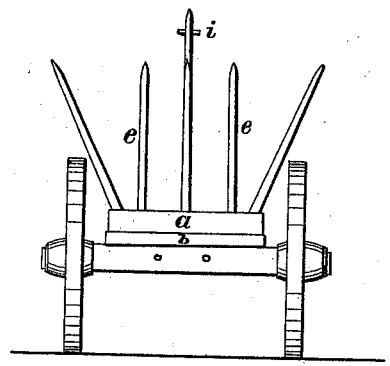
Figure 4:
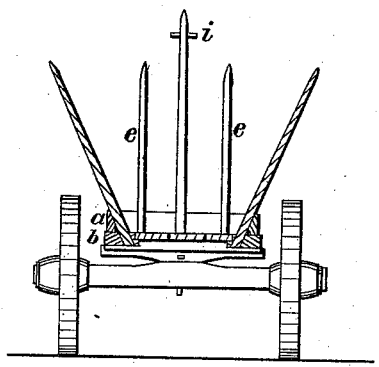
Figure 3:
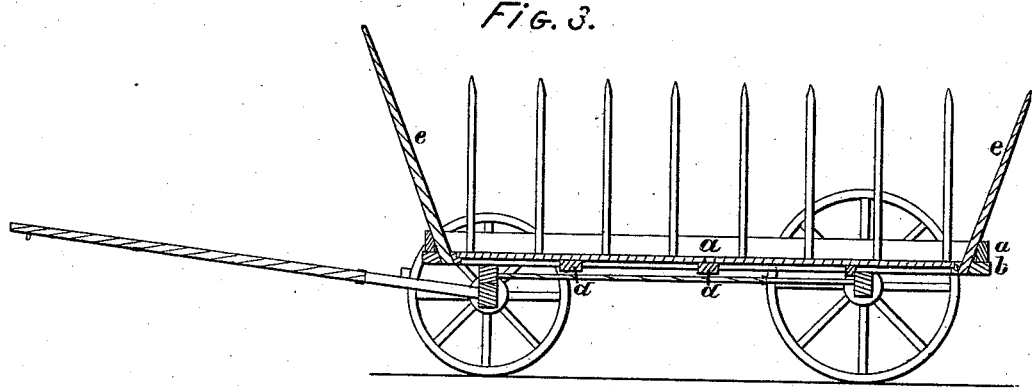
Figure 6:
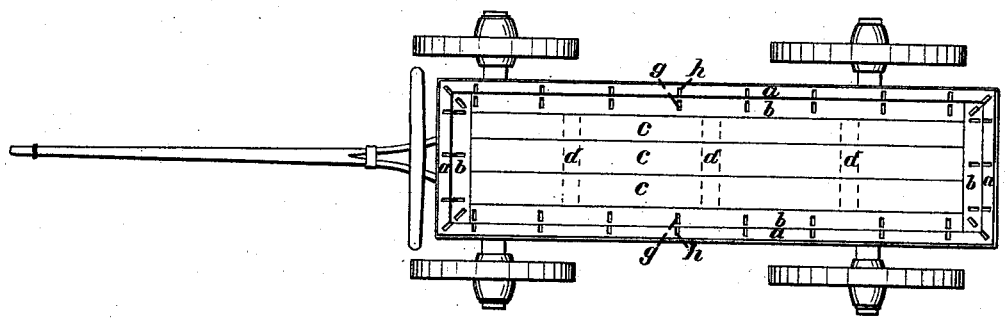
Figure 5:
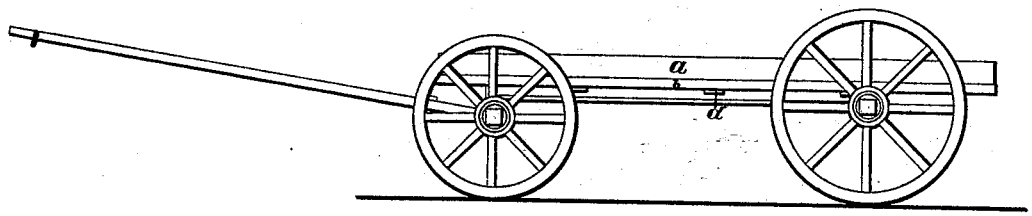

Figure 1 is a side elevation of the cart as a hay-cart; Fig. 2, a rear elevation thereof; Fig. 3, a longitudinal section, and Fig. 4 a transverse section. Fig. 5 is a side elevation of the cart as a box-cart, and Fig. 6 a plan thereof.

Figure 7:
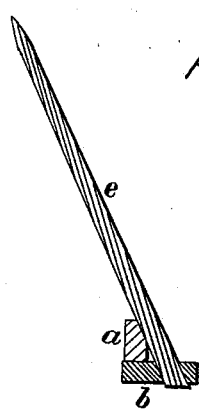

The body of the cart is made of plank put together in angular form to give it strength, and to support the stakes. Each of its sides and ends is formed of two parts, marked, respectively, *a* and *b* in the drawings, the part *a* being in a vertical position and the part *b* in a horizontal position, the lower edge of the upright part resting on a side and near the outer edge of the horizontal part, as shown in section in Figs. 3, 4, and 7. The two parts are firmly bolted together, thus forming angular bars, which make the sides and ends of the cart-body, the sides and ends being securely jointed together at the corners where they meet. The horizontal part of the angular bars to some extent forms the bottom or floor of the cart, while the remaining portion is formed of boards *c*, supported by cross-bars *d*, which are secured to the under side of the angular bars just mentioned.

I have thus far described the cart-body as it is intended to be used as a box-cart. I will now describe the mode of applying the stakes to fit it for a hay-cart.

Figure 8:

The stakes are marked *e* in the drawings. They are provided with a tenon, *f*, (see Fig. 8,) at their lower ends, while their upper ends are made pointed to allow the hay to pass freely into the cart. A series of mortises, *g*, are made in the horizontal part of the cart-body, and a corresponding number of notches, *h*, are formed in the inner corner of the upper edge of the upright part. The tenons of the stakes are inserted in their respective mortises, while the stakes receive additional support by resting in their corresponding notches. These parts and their relation to each other are represented on an enlarged scale in Fig. 7.

It will be readily seen that by this arrangement comparatively long stakes may be amply supported without the usual top rail; that the stakes may flare or be so widely spread at their upper ends as to increase the holding capacity of the cart, and that they may be easily removed and replaced to change it from a hay-cart to a box-cart, and vice versa. The number of stakes to be used may be varied according to the size of the cart to be built, and the firmness of the hay to be transported; and, whatever their number may be, one should be placed in each corner of the cart-body. The middle stake of the forward end of the cart is longer than the others, and is provided with a pin, *i*, to which the reins (when horses are used) may be hitched, while the driver attends to loading the hay. The wheels may be applied to the cart-body, as is usual. Four wheels may be used, as represented in the drawings, or only two, as in the common ox-cart.

I do not intend to confine myself to the precise form and arrangement of the parts, as above specified, for they may be varied within the principles of my invention; as, for example, instead of making the lower ends of the stakes square with a square tenon, as above specified, they may be turned their whole length, and have a round tenon, whereby a hole bored in the horizontal part of the cart-body may take the place of a mortise. So, also, the upright part of the cart-body may be varied in width according to the requirements of a box-cart, and they may be placed obliquely—that is, flare outwardly—instead of being placed vertically, as herein represented.

What I claim as new, and desire to secure by Letters Patent, is—

In combination with a cart-body, constructed substantially as herein represented and described, a series of stakes, when said stakes are inserted in its horizontal part, and supported by its upright part, substantially as and for the purposes specified.

ERASTUS BRIGHAM BIGELOW.

Witnesses:
JOHN T. WHITMAN,
DANIEL MERRIMAN.